United States Patent
Ban

[15] 3,668,077
[45] June 6, 1972

[54] PROCESS FOR CONVERSION OF MUNICIPAL WASTE

[72] Inventor: Thomas E. Ban, South Euclid, Ohio

[73] Assignee: McDowell-Wellman Engineering Company, Cleveland, Ohio

[22] Filed: June 19, 1970

[21] Appl. No.: 47,713

[52] U.S. Cl..................................201/29, 201/29, 201/32, 201/37, 201/44, 110/15
[51] Int. Cl. .......................................................C01b 49/06
[58] Field of Search......................201/32, 36, 37, 39, 25, 29, 201/44; 110/15, 8 A

[56] References Cited

UNITED STATES PATENTS

| 3,325,395 | 6/1967 | Ban | 201/32 |
| 2,057,681 | 10/1936 | Harrington | 110/15 |
| 3,362,887 | 1/1968 | Rodgers | 201/25 |
| 3,483,115 | 12/1969 | Haddad et al. | 201/32 X |

*Primary Examiner*—Norman Yudkoff
*Assistant Examiner*—David Edwards
*Attorney*—McNenny, Farrington, Pearne and Gordon

[57] ABSTRACT

There is provided a process for treating municipal solid waste or the like characterized by disposing such material as a burden on a traveling grate, passing hot gases through the burden to carbonize carbonizable fractions thereof, and separating gas-entrained materials, e.g. water and organic materials, from the gases issuing from the burden. The unvolatilized solid material is composed largely of glass and metallics which may be further processed as desired. The process is characterized in that it is adaptable to continuous treatment of solid waste material, e.g. rubbish.

10 Claims, 2 Drawing Figures

DIAGRAM OF COMBUSTED FIXED CARBON FOR CARBONIZING RAW MUNICIPAL REFUSE

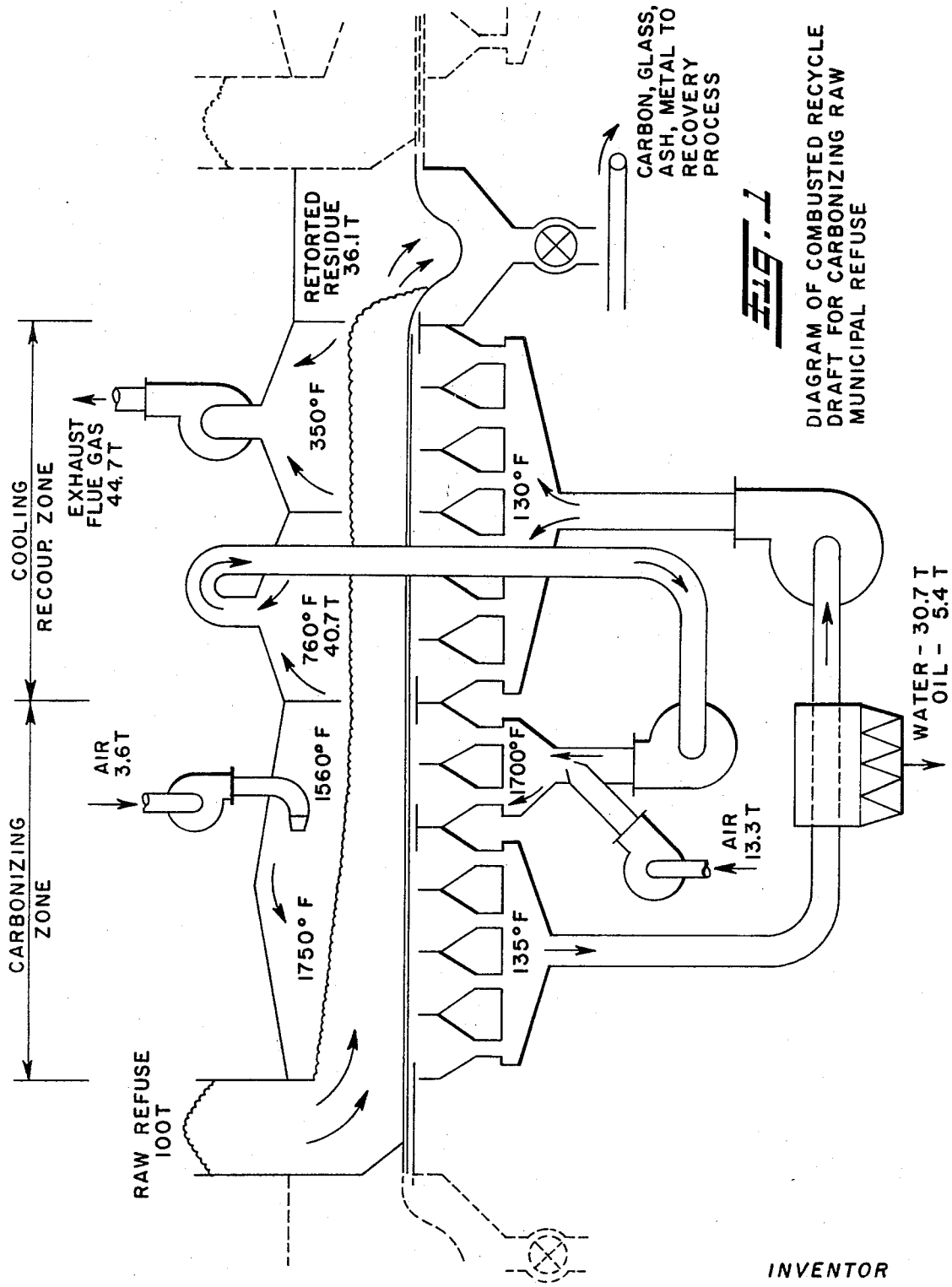

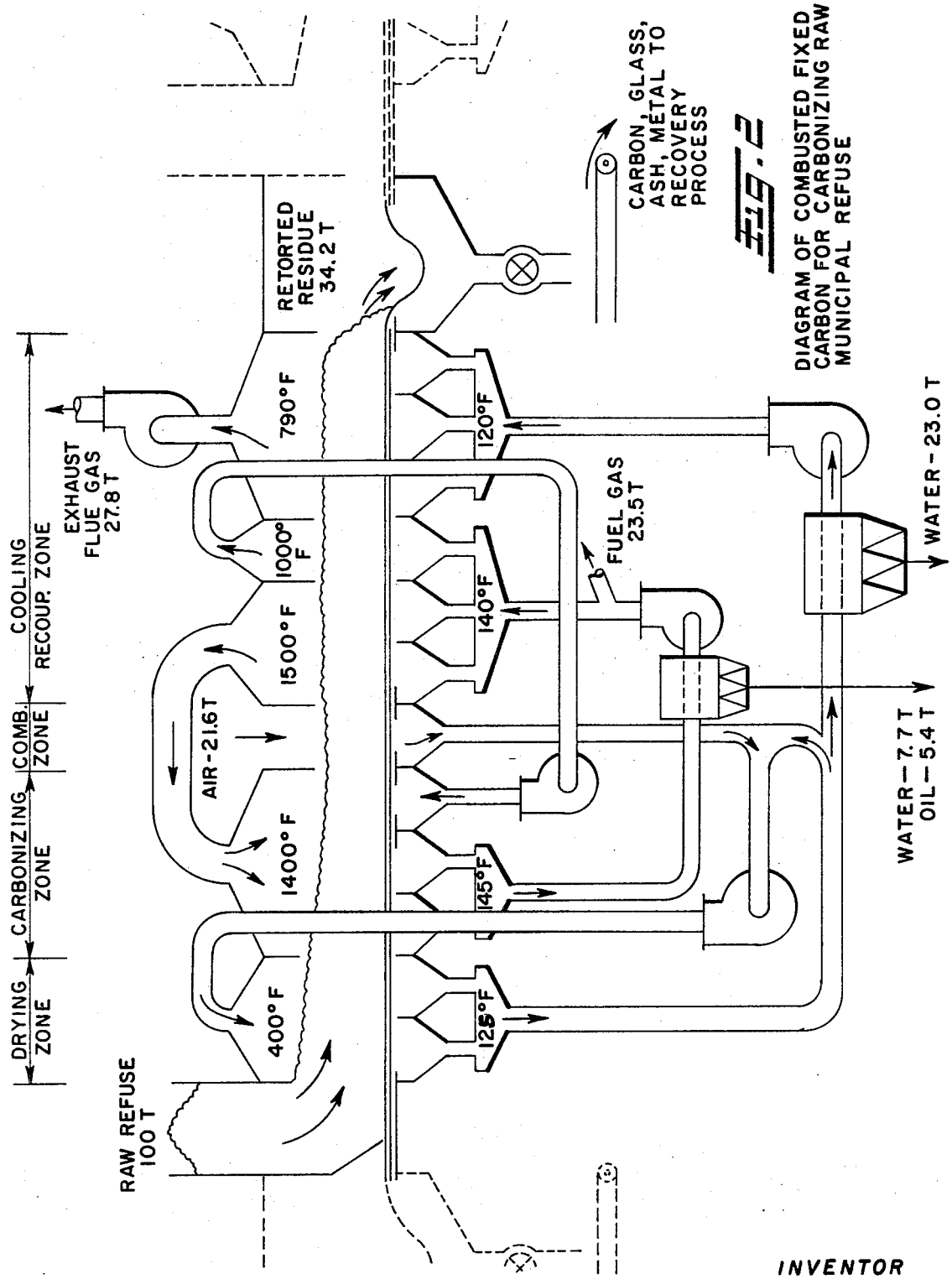

PROCESS FOR CONVERSION OF MUNICIPAL WASTE

BACKGROUND OF INVENTION AND PRIOR ART

This invention relates to the field of pollution control, and more particularly to the field of treating municipal solid waste material. "Municipal solid waste" as that term is used herein will be understood as referring to raw refuse such as domestic rubbish and garbage of the type which is discarded within municipalities and handled by collection and disposal systems. It will be understood that although the term suggests only such waste as is collected by a municipality and/or treated by a municipality, the present invention is applicable to and includes such solid waste material whether or not a municipality has been involved in its collection or treatment.

Municipal solid waste although variable from time to time and from place to place has been analyzed to be of the following average composition:

| | |
|---|---|
| Paper, cardboard, etc. | 50–70% |
| Miscellaneous organics, such as plastic, wood, food products, etc. | 10–20% |
| Nonmetallic materials such as metallic oxides, glass, earth, ceramics, etc. | 10–20% |
| Ferrous metals such as iron and steel | 5–10% |
| Nonferrous metals such as copper, aluminum, zinc, etc. | 0.2–1% |

The municipal solid waste is generally a heterogeneous mass containing individual structures as large as the household garbage container, and some as fine as dust. It may contain abundant quantities of water as will result for example when collection is made on a rainy day. Alternatively, the material may be relatively dry. Municipal solid waste is generally collected from households by a municipality or private collection agency for disposal by incineration or composting by land fill. Each technique permits decomposition or gasification of organic material which leaves a residue comprised of relatively inert solids.

The present process provides a novel process of thermally decomposing the entire mass of municipal solid waste and recovery of valuable products from pyrolysis and separation. Generally, the process contemplates a carbonizing or retorting process utilizing continuous destructive distillation techniques to thermally decompose organic material at temperatures between about 1,000 and 2,000° F. in the absence of oxygen or in the presence of insufficient quantities of oxygen for combustion to convert the organic materials into four basic constituents. These are (1) solid carbonaceous char, (2) condensable organic liquid, (3) water, and (4) a normally gaseous fuel gas. Solid residue from the pyrolytic carbonization of the municipal solid waste which contains both organic and inorganic residues is comprised of a mixture of separable carbonaceous char, nonmetallic ash, nonferrous metals and ferrous metals.

Sizable tonnages of municipal solid waste are generated within this country. During the year 1968, for example, approximately 165 million tons of such solid waste were generated, amounting to approximately 1,500 lbs. per person. By 1980, it is estimated that this will approach 300 million tons annually.

BRIEF DESCRIPTION OF THE INVENTION

Briefly stated, the present invention is in a process for treating municipal solid waste material, or the like, which comprises the steps of depositing a burden of such waste material on a traveling grate of either linear or circular configuration; moving the burden into a carbonizing zone, with or without a preliminary drying zone or preheating zone; passing heated gas through the burden transversely to the direction of movement of the burden, the hot gas containing no more than about 5 percent of oxygen and being at a temperature between about 1,000° and 2,000° F. before passage through the burden; separating gas-entrained material, e.g. water and organic material from the gas after passage through the burden; moving the burden into a cooling zone; and repassing at least a portion of the gas through the burden transversely to the movement of the burden in the cooling zone.

BRIEF DESCRIPTION OF THE DRAWINGS

In the annexed drawings there are illustrated in diagrammatic and schematic form two embodiments of the present invention, each of which is characterized by a carbonizing zone, a separation of gas-entrained material, and a cooling zone, and wherein:

FIG. 1 illustrates with quantitative values a simplified process showing charging raw municipal solid waste or raw refuse to a traveling grate, movement through a carbonizing zone, separation of water and organic oil, and passage through a cooling zone and final discharge from the apparatus, the letter "T" indicating "tons."

FIG. 2 shows a more sophisticated procedure also involving the principal steps shown in the process of FIG. 1, but including additionally a drying zone and a combustion zone adjacent the carbonizing zone.

DETAILED DESCRIPTION OF THE PROCESS WITH REFERENCE TO THE DRAWINGS

The carbonizing techniques described herein relate to a continuous system of thermal decomposition of organic material with recovery of by-products. This process may also be referred to as a retorting process because the thermal decomposition takes place out of the presence of substantial quantities of oxygen. Carbonization in accordance herewith utilizes a traveling grate apparatus, preferably one of conventional linear structure, or for example, a circular structure such as the apparatus shown and described in U.S. Pat. No. 3,302,936 dated Feb. 7, 1967. These devices utilize heat transfer by convection from inert or reducing gases to the solid masses or burdens carried thereon. Raw refuse, such as municipal solid waste materials as above identified, is continuously charged to a traveling grate, supported in a horizontal attitude on the grates, and is intercepted vertically by induced or forced hot gases ranging in temperature from about 500° F. to about 2,000° F. measured before passage through the burden. These gases bring about the thermal decomposition of the organic moiety of such solid waste material. Paper, wood, plastic, animal and vegetable refuse, etc., are decomposed into four separable fractions:

1. Solid carbonaceous char with minimum amounts of volatile matter constituents, i.e. less than about 5 percent by weight;
2. Condensable organic liquid;
3. Water; and
4. A noncondensable fuel gas.

The inorganic constituents of the municipal solid waste material are heat treated and are unaffected for the most part. These materials are largely metallic and nonmetallic such as free metals, glass and earth. Thus the entire carbonization process for treating solid wastes yields gaseous products such as fuel gas which may be separated; liquid product such as organic liquids and water which may also be separated; and solid products such as carbonaceous char, nonmetallics and metallics which constitute a residue discharged from the remote extremity of the traveling grate apparatus, and of considerably less mass than the mass of the burden as charged.

A preferred form of apparatus in which to conduct the process of the present invention is a sealed circular reactor of the type shown and described in the aforementioned U.S. patent and which recycles and directs a reducing or inert gas draft through the solid charge without infiltrating uncontrollable amounts of ambient air. The first technique (FIG. 1) utilizes a combusted recycle draft for supporting heat for carbonizing, and the second technique (FIG. 2) utilizes combusted fixed carbon in the burden as the source of heat.

FIG. 1 illustrates the first technique, and FIG. 2 illustrates the second. The first system yields relatively high amounts of lean fuel gas as a by-product, and the second yields lower amounts of a richer fuel gas as a by-product.

Referring now more particularly to FIG. 1, there is here illustrated in diagrammatic and schematic form a system together with a materials balance for carbonizing raw refuse or municipal solid waste material using combusted recycle draft. Municipal solid waste in an "as received" condition or in a shredded condition, or in a balled condition, or in some similar pretreated condition is charged to a continuous traveling grate to form a burden thereon having a thickness preferably about 5 feet. The thickness may vary from 1 to 10 feet. As the charge is moved along by the horizontal travel of the traveling grate, it becomes intercepted by hot combusted recycle downdraft in the initial downdraft portion of the carbonizing zone. At a later point in the carbonizing zone, the charge is subjected to a hot updraft and carbonizing is further carried out. The temperature of the gases as they enter the burden in this region is generally in the range, as shown, of from 1,560° to 1,750° F. The gases pass through the burden at a rate of from 100 to 350 standard cubic feet per minute per square foot of grate area. The charge then enters the initial hood of a cooling zone where it becomes cooled by means of recycle gases. In the second and final stage of cooling, the gases are vented as shown in the drawing as lean flue gases, and the charge is cooled to approximately 100° to 300° F. and recovered as a charred residue available for separation and recovery of metallics, both ferrous and nonferrous, and nonmetallics.

The carbonizing gases issuing from the bottom of the burden in the initial downdraft carbonizing zone contain liquids, at least a portion of which are partially condensed within the body of the burden and issue as a mist. Such condensation is brought about by the lower layers of cooler unreacted mass and the cooler metal members of the traveling grate itself. The condensed products including the mist are separated by centrifugal, electrostatic, cooling or scrubbing separators in contact with the gas stream. The noncondensable gases are recycled to the cooling zone.

The carbonization cycle is sustained by combustion of the generated flue gases within the gas confining hood of the initial carbonizing zone. A portion of air is admitted to permit combustion of a part of the recycled gases thereby elevating the temperature of the draft mass. Also, within the windboxes beneath the traveling grate in the updraft stage of carbonizing, air may be admitted to cause combustion of a part of the gas constituents to elevate the temperature of the recycle gases. The combustible part of the gas includes hydrocarbons, e.g. methane, etc.

Carbonizing including both a downdraft stage and an updraft stage is a preferred system for transmitting heat to the burden solids. Although about 75 percent of the carbonizing step is performed by the downdraft operation, certain bottom layers of the charge may remain unaffected because of the cooling effect of condensation and agglomeration within such lower layers. An entirely updraft carbonizing zone may be used as well as an entirely downdraft zone, or several successive mixed cycles of updraft and downdraft can be applied as desired.

It is also contemplated that the bed or burden may be agitated by the emplacement within the body of the traveling grate machine of a rotary or stationary stirring mechanism to bring about more uniform carbonizing of the burden, and to maintain proper gas flow through the burden. The dotted lines in FIG. 1 include a circular traveling grate system, whereas the solid lines indicate a linear traveling grate.

Referring now more particularly to FIG. 2 in which both circular and linear systems are indicated, there is here shown a different traveling grate system for retorting or carbonizing and the fuel gas generated by this process is relatively rich in fuel components. The heat for the draft system is supplied by a controlled downdraft of air admitted intermediate downdraft and updraft carbonizing zone portions which ignites the heated char residue including fixed carbon and generates, therefore, hot flue gas for the drying and carbonizing zones. The physical condition of the material charged to the traveling grate may be the same as for the system shown in FIG. 1. Heat treatment in the case illustrated in FIG. 2 is carried out in two thermal stages. The initial stage involves treatment in a drying zone with relatively low temperature gases, i.e. below about 600° F., which is largely used for drying and preheating the mass. This preheating or drying stage is followed by downdraft and updraft high temperature carbonizing, the gas temperatures approaching 2,000° F. prior to re-entry into the burden. The charge enters the combustion zone where controlled amounts of air permit combustion of carbon to supply heat which is (a) directly transmitted to the solids and metal members of the grate and (b) indirectly transmitted to the recycle draft. The burden then enters the cooling zone. The initial stage of cooling where the temperatures are the highest continues the carbonization, initiates cooling and supplies high temperature draft which is desirable for reuse in direct carbonizing. The gases are recirculated to the downdraft portion at a slightly lower carbonizing temperature. This is followed by somewhat lower temperature (1,000° F.) cooling action and updraft carbonizing. A final stage of cooling brings the temperature of solid materials down to a temperature of 100° to 300° F. where they are capable of being handled for separation and recovery of valuable constituents.

The gases from the first stage of drying in the process of FIG. 2 are largely inert or slightly reducing as derived from the combustion zone. These are conveniently blended with recirculated draft which lowers the temperature of the gases to a point lower than that required for thermal decomposition, i.e. less than about 300° F. After passing through the bed, these gases contain water as a condensed mist brought about by at least partial condensation within the cooler lower layers of the burden and by the metal members of the grates. The water as a mist is separated by conventional techniques, such as centrifugal, electrostatic, or by scrubbers, and the noncondensed inert gases are used for the final stage of cooling the charge. After passing through the terminal portion of the burden, these gases may be exhausted as flue gas or further processed as may be required. In the high temperature stage of carbonizing, the decomposition products water, oil, and flue gas, are induced in a downward direction, and the condensable moieties converted at least in part to a liquid state as a mist caused by the lower temperature of the lower layers of the solids charged or burden and the metal members of the grate. Water and organic liquids, usually in the form of an oil, are separated by conventional techniques. A rich fuel gas may be vented, and the balance of the gas is recirculated for cooling and recuperation purposes. Carbonization is illustrated as occurring with both updraft and downdraft. This is a preferred technique although it is apparent that an all updraft or an all downdraft or multiple updraft/downdraft may be used. As in the apparatus schematically illustrated in FIG. 1, mechanical or stationary bed agitators may be applied for making the draft flow more uniform and for making the carbonization more uniform. In this modification of the invention, heat for the high temperature gases for carbonization is supplied by combustion of fixed carbon.

The solids residue discharged from the exit extremity of the traveling grate machine includes char, ferrous metals, nonferrous metals, and nonmetallic solids. The char is a solid carbonaceous residue formed by pyrolytic decomposition of organic materials such as wood, paper, plastic, and vegetable or animal matter. The material is weak structured, of low density, and is comprised of approximately 80 percent carbon. The balance is volatile matter and ash residue of the organics. The ferrous metal moiety includes iron and steel scrap originating from tin cans, bottle caps, nails, etc. This material when shredded is relatively dense, has high magnetic characteristics, and may contain iron oxide scale.

The nonferrous moiety includes such nonmagnetic metals as aluminum, zinc, copper, tin, etc., originating as foil, aluminum containers, wire, castings, etc. This material is maleable, relatively dense, and has nonmagnetic characteristics. Thus, magnetic separation may be used to separate the ferrous and the nonferrous metals.

The nonmetallics are comprised largely of glass, ceramics, earth, cement, and masonry products. These are derived from scrap materials such as disposable bottles, broken dishes, soil, and building material rubbish. The material has medium density, is of a fryable nature and through pyrolysis may be converted into a heterogeneous mass of glass oxides.

Numerous separation schemes are available which take advantage of the physical properties of the solids residues. Those are well known to those skilled in the art and need not be further discussed herein.

There has thus been provided a processing system for converting municipal solid waste materials into valuable products. Through conversion, separation and upgrading, the by-products of the process of the present invention may be converted into the following materials:

a. distilled water
b. fuel gas
c. low sulfur carbon residue
d. an oil-like liquid containing alcohol, organic acids, hydrocarbons, etc.
e. iron or pig iron
f. nonferrous alloy which can be used as a source of individual metals
g. a glassy constituent useful in making lightweight aggregates.

The processes of the present invention avoid pollution of the atmosphere since combustion is kept to a minimum. Volatile gases are appropriately treated before discharge into the atmosphere and the solid residues may be processed as indicated above for the recovery of valuable constituents.

What is claimed is:

1. A process for treating municipal solid waste material comprising:
    a. depositing a burden of such waste material on a traveling grate to a depth of from 1 to 10 feet;
    b. moving said burden into a drying zone;
    c. passing heated gas through said burden in said drying zone transversely to the direction of movement of the burden, said gas being at a temperature between about 250° F. and about 600° F.;
    d. moving said burden into a carbonizing zone;
    e. passing heated gas at a rate of from 100 to 350 standard cubic feet per minute per square foot of grate area through said burden transversely to the direction of movement of the burden, said hot gas containing no more than about 5 percent of oxygen and being at a temperature between about 1,000° F. and about 2,000° F. before passage through the burden;
    f. recycling at least a portion of the gas exiting from the burden in said carbonizing zone to said drying zone;
    g. separating gas-entrained material from said gas after passage through said burden;
    h. moving said burden into a cooling zone; and
    i. repassing at least a portion of said gas through said burden transversely to the direction of movement of the burden in said cooling zone.

2. A process in accordance with claim 1 in which a portion of the gas passed through the drying zone is recycled from the carbonizing zone and the balance is recycled from the drying zone after mixing with the portion from the carbonizing zone.

3. A process in accordance with claim 1 which is additionally characterized by the introduction of air into the gases passing through the carbonizing zone to promote combustion of a portion of the carbon formed in the carbonizing zone.

4. A process in accordance with claim 1 wherein the plane of the grate is horizontally disposed.

5. A process in accordance with claim 1 wherein the burden moves along a circular path.

6. A process in accordance with claim 1 wherein the burden moves along a linear path.

7. A process in accordance with claim 4 in which the heated gas is passed downwardly through the burden.

8. A process in accordance with claim 1 in which the gas passed through the cooling zone is passed in a direction opposite to the direction of the heated gas passed through the carbonizing zone.

9. A process in accordance with claim 1 in which the hot gases are chemically reducing.

10. A process in accordance with claim 1 in which the separation of gas-entrained material is effected by cooling the gas to liquefy condensable material.

* * * * *